No. 807,462. PATENTED DEC. 19, 1905.
J. S. HEATON.
FILTER.
APPLICATION FILED AUG. 2, 1905.
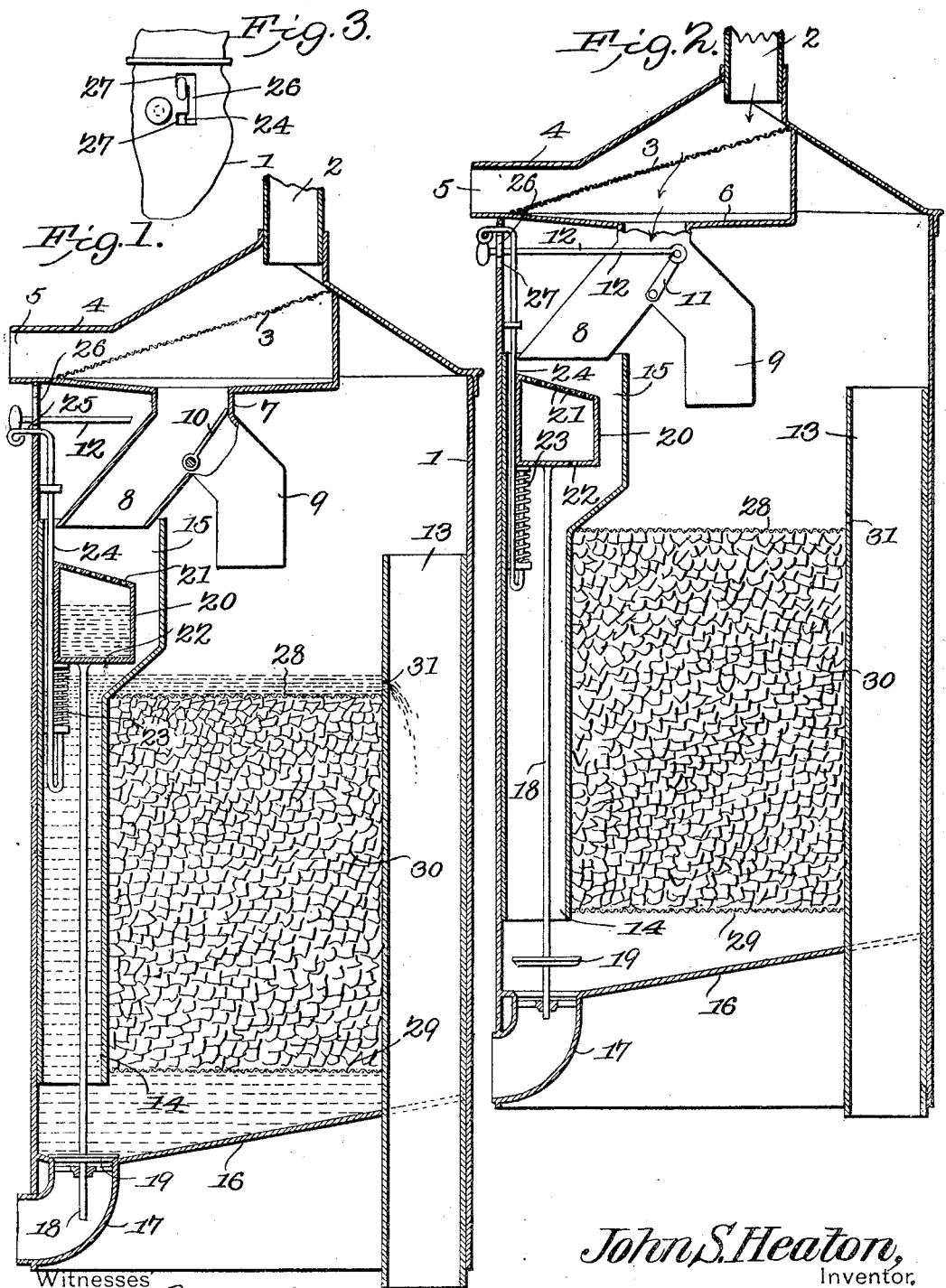
Witnesses
John S. Heaton,
Inventor.
by C. A. Snow & Co
Attorneys

UNITED STATES PATENT OFFICE.

JOHN SMITH HEATON, OF SHELBYVILLE, KENTUCKY.

FILTER.

No. 807,462.  Specification of Letters Patent.  Patented Dec. 19, 1905.

Application filed August 2, 1905. Serial No. 272,421.

*To all whom it may concern:*

Be it known that I, JOHN SMITH HEATON, a citizen of the United States, residing at Shelbyville, in the county of Shelby and State of Kentucky, have invented a new and useful Filter, of which the following is a specification.

This invention relates to filters, and especially to that class of filters which are connected with rain-water conduits for the purpose of removing impurities from the water before admitting it into a cistern.

The invention has for its object to simplify and improve the construction and operation of this class of devices; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In said drawings, Figure 1 is a vertical sectional view of a filter constructed in accordance with the principles of the invention, showing the same full of water as during the operation of the device. Fig. 2 is a vertical sectional view showing the filter empty. Fig. 3 is a detail front view of a small part of the casing.

Corresponding parts in the several figures are indicated throughout by similar characters of reference.

The casing 1 of the improved filter may be made of sheet metal and of any desired size or shape, although it is usually and preferably cylindrical. The casing is provided at its upper end with an inlet 2, beneath which is arranged an inclined strainer 3, and at the lower end of said strainer the top of the casing is provided with an extension or spout 4, having a discharge-opening 5, through which leaves and other trash entering the pipe 2 will be discharged, so as to prevent clogging or otherwise obstructing the filter.

The casing is provided, near its upper end below the strainer, with a dished diaphragm 6, with which is connected a downward-extending spout 7, having two branches 8 and 9, between which is disposed a cut-off valve 10, operable by a crank 11 and a handle 12, which latter extends through the front wall of the casing.

Within the casing there is disposed a conducting-pipe 13, which extends through the bottom of the casing and leads to the cistern. This pipe has been shown in the rear part of the casing, and in the front part of the casing there is disposed a conduit 14, terminating above the bottom of the casing and enlarged at its upper end to form a chamber 15, which is in registry with the spout 8. The bottom 16 of the casing is inclined and is provided with a discharge-spout 17, the upper end of which constitutes a valve-seat.

18 is a valve-stem extending through the conduit 14 and carrying at its lower end the valve 19, adapted to engage the seat at the upper end of the discharge-spout. The upper end of the valve-stem carries a box 20, having an inclined foraminous top 21 and provided in the bottom thereof with a single small perforation 22. A spring 23 is provided to exert upward pressure upon the under side of the box, said pressure being sufficient to maintain the box and the valve-stem normally in a raised and the valve in an unseated position, as shown in Fig. 2. The spring 23 is coiled upon a suitably-guided operating-rod 24, loosely engaging the under side of the box 20 to support said box and having a bent portion 25 extending through a slot 26 in the front wall of the casing, said slot being provided with lateral notches 27, adapted to be engaged by the bent portion 25, thereby enabling the operating-rod to be positively retained either in a raised or lowered position and also enabling the operating-rod, together with the box and the valve, to be positively retained in a raised position when desired. The casing is provided with two foraminous diaphragms of perforated sheet metal, wire-netting, or the like, one of said diaphragms being disposed some distance below the upper ends of the conduits 13 and 14, about at the level of the bottom of the chamber or enlargement 15 of the latter, as at 28, the other diaphragm 29 being disposed slightly above the lower end of the conduit 14. The space between these diaphragms is filled with a packing 30, of charcoal or other suitable material.

It will be observed that the branch 9 of the spout 7 is disposed to discharge directly upon the upper diaphragm 28 of the filtering-compartment, also that such branch terminates slightly below the upper end of the conduit 13. The latter is provided above and closely adjacent to the upper diaphragm 28 with a small drain or vent opening 31.

The normal position of the cut-off 10 is indicated in Fig. 1 of the drawings, by reference to which it will be seen that water entering through the inlet 2 after passing through the strainer 3 is guided through the duct 8 into the upper end of the conduit 14. The normal position of the valve 19 has been indicated in Fig. 2, by reference to which it will be seen that said valve is raised from its seat, leaving the outlet 17 unobstructed. The first rush of water will escape through the outlet 17, but the box 20 will gradually become filled with water entering through the foraminous top thereof, and the valve being thus weighted will become seated, the weight being sufficient to overcome the tension of the spring 23. The outlet being thus obstructed water will rise through the filtering material contained between the diaphragms 28 and 29 and will eventually overflow into the open upper end of the conduit 13, whereby the pure filtered water will be conveyed to the cistern or place of storage.

When the supply ceases, the water above the diaphragm 28 will gradually drain out through the vent-opening 31. As the level becomes lowered below the bottom of the box 20 the contents of the latter will escape through the opening 22 until the tension of the spring 23 becomes sufficient to lift and unseat the valve, when the contents of the filtering-compartment and the water standing below the latter and in the conduit 14 will escape with a rush through the outlet 17, carrying with it such impurities as may have settled in the bottom of the casing or as may adhere to the under side of the diaphragm 29.

This improved filter, as will be observed, is entirely automatic in its operation, it is practically self-cleansing, and it may be relied upon to operate effectively under all ordinary conditions.

When the cistern is full, water may be permitted to run to waste by so engaging the bent portion of the rod 24 with one of the notches 27 as to sustain the valve 19 in an unseated position.

If the contents of the filter should become foul, the valve may be sustained in an unseated position and the cut-off 10 may be adjusted to direct the flow of water through the duct 9 onto the diaphragm 28, causing it to pass downwardly through the filtering material, carrying with it such foul matter as may be contained therein and permitting the same to escape through the outlet 17.

Having thus described the invention, what is claimed is—

1. In a rain-water filter, a valve-operating device including a stem carrying a valve at its lower end and having at its upper end a box provided with an inclined foraminous top and a single bottom opening, a suitably-guided vertically-movable operating-rod loosely engaging the under side of the box, a spring coiled upon said rod to balance the weight of the box and related parts, and means for locking the operating-rod at various adjustments.

2. A filter-casing having a strainer, a dished diaphragm below said strainer and a spout depending from said diaphragm and having divergent ducts and a cut-off between said ducts; a conduit within the casing beneath one of the ducts and terminating above the bottom of the casing; a conduit extending through the bottom of the casing, perforated diaphragms in the casing, filtering material between said diaphragms, an outlet in the bottom of the casing, a valve for said outlet mounted upon a stem extending through the receiving-conduit, a box connected with said stem and having a foraminous top and a drain-opening in the bottom thereof, and means for normally supporting the box in a raised and the valve in an unseated position; the discharge-conduit being provided with a drain-opening above the upper diaphragm of the filtering-compartment.

In testimony that I claim the foregoing as my own I have hereto affixed my signature in the presence of two witnesses.

JNO. SMITH HEATON.

Witnesses:
A. W. PROCTOR, Jr.,
H. T. FINNELL.